United States Patent [19]

Erbes et al.

[11] Patent Number: 5,168,506

[45] Date of Patent: Dec. 1, 1992

[54] METHOD FOR PROTECTED RADIO SIGNAL TRANSMISSION

[75] Inventors: Norbert Erbes, Karlsruhe; Kurt Hechfellner, Taufkirchen; Herbert Baumann, Munich, all of Fed. Rep. of Germany

[73] Assignees: Siemens Aktiengesellschaft, Berlin; Standard Elektrik Lorenz AG, Munich, both of Fed. Rep. of Germany

[21] Appl. No.: 788,559

[22] Filed: Aug. 5, 1985

[30] Foreign Application Priority Data

Aug. 10, 1984 [DE] Fed. Rep. of Germany ....... 3429453

[51] Int. Cl.$^5$ ............................................ H04L 27/30
[52] U.S. Cl. .............................................. 375/1; 380/34
[58] Field of Search ................ 375/1.0, 111, 114, 118, 375/107; 371/42; 370/105, 106, 100, 100.1; 380/6, 33, 34; 455/49, 59, 63, 276, 49.1, 276.1

[56] References Cited

U.S. PATENT DOCUMENTS

| | | | |
|---|---|---|---|
| 4,361,890 | 11/1982 | Green, Jr. et al. | 370/106 |
| 4,409,684 | 10/1983 | Pooch et al. | 371/42 |
| 4,514,852 | 4/1985 | Hanni et al. | 375/1 |
| 4,587,662 | 5/1986 | Langewellpott | 375/1 |
| 4,598,413 | 7/1986 | Szèchènyi | 370/105 |
| 4,665,533 | 5/1987 | Tomikawa | 370/105 |

OTHER PUBLICATIONS

G. Baroker et al., "A Digitally Compensated TCXO"; Zie Voor Titel Boek, (pp. 191-198, no date given).

Primary Examiner—Bernarr E. Gregory
Attorney, Agent, or Firm—Hill, Van Santen, Steadman & Simpson

[57] ABSTRACT

In radio operation in tactical use, an increased jamming resistance with respect to intentional jamming is required. For protection against intentional jamming, frequency hopping techniques have proven very advantageous in which the signals are transmitted in the form of successive error-protected signal blocks where each signal block is transmitted on a different radio carrier frequency which changes in a pseudo-random manner. With this technique, phase shifts can occur which are greater than half a bit and therefore make analysis of the signal blocks difficult or impossible. It is proposed herein that each received signal block be checked after regeneration in a regenerative repeater, controlled by a bit clock pulse, as to its correct block phase and therefore, respectively, newly establish the block clock pulse phase required for further accurate processing of a signal block.

8 Claims, 3 Drawing Sheets

METHOD FOR PROTECTED RADIO SIGNAL TRANSMISSION

BACKGROUND OF THE INVENTION

1. Field of the Invention

The present invention relates to a method for protected transmission of digital, or digitized, respectively, signals via radio circuits, wherein the transmission of the signals, possible encoded, proceeds in a blockwise manner (burst operation) with blockwise pseudo-randomly alternating radio carrier frequencies (frequency hopping), and wherein the successive signal blocks are respectively provided with an error protection, and wherein the synchronization between two stations is brought about in conjunction with highly-accurate quartz clocks arranged at the stations, by means of a time signal in the form of a code sequence having good auto-correlation properties, which time signal is transmitted at least at the beginning of a signal transmission.

2. Description of the Prior Art

Methods of the type generally set forth above are known in the art, for example, from the German patent 32 30 726 A1. As has been shown, for the operational protection of a radio transmission path, the diversity techniques which have been employed for decades in conjunction with error protection measures no longer suffice when the transmission path is electronically jammed in an intentional manner. In order to be able to combat such intentional interference successfully, it is necessary to alter the radio frequency carrier employed for the signal transmission in a pseudo-random manner in a sequence which is as rapid as possible. In the case of such a frequency hopping operation, in order to obtain the signal pauses necessary for switching the radio carrier frequencies, the signals to be transmitted which are present on the transmitting side are first compressed in time and then transmitted to the receiving side in successive signal blocks with a radio carrier frequency alternating from signal block-to-signal block. Customarily, each signal block is provided with an error protection, so that, at the receiver, every signal block can be checked as to whether it is utilizable for further interpretation or if it must be rejected as disturbed. The synchronization between two end stations, necessary for satisfactory transmission, is achieved through highly-accurate quartz clocks at the stations in a simple manner in that, at least at the beginning of a transmission from the transmitting station to the receiving station, a time signal is transmitted. With the aid of such a time signal, the cryptographic equipment, provided at the station in the case of signal encoding, is also indirectly synchronized.

The satisfactory operating properties of a radio transmission path are generally impaired by so-called fadings which are brought about by superimposition of several radio signals originating from the same source. In the use of mobile radio stations, strong fluctuations of the receiving field intensity can also be caused by locally-induced shadowings. The negative influence of such fadings, as well as of the shadow areas, on the signal reception are mitigated in that radio waves, as a rule, propagate on several paths, and therefore, in most instances, a signal reception, even if with substantially less receiving field intensity, is also still possible when the receiving path on which the reception is being carried out at the time intermittently fails entirely. In the case of application of a frequency hopping operation, this phenomenon of multipath propagation has an extremely disadvantageous effect on a satisfactory operation of a radio path because the sum levels also vary in dependence upon the employed radio carrier frequencies, and therefore, frequency-selective fadings of this type lead to the result that the receiver is forced to receive the successive incoming signal blocks because of the constantly alternating radio carrier frequencies, in dependence upon the radio carrier frequency, on different transmission paths. Since the different transmission paths can exhibit different transit times which are greater than half a bit, the incoming signal blocks, in spite of bit clock pulse synchronization, can occasionally no longer be correctly processed. In other words, the signal block phase can jump from signal block-to-signal block by one or more bit intervals depending upon whether the incoming signal block reaches the receiver on the direct transmission path or over a substantially longer, indirect route.

SUMMARY THE INVENTION

The object of the present invention, for radio networks, in particular surface radio networks, having frequency jumping operation, is to provide a solution for a method which makes it possible to satisfactorily process the signal blocks arriving at the receiver even when the signal block phase of the successive signal blocks exhibits phase shifts which lie on the order of magnitude of one bit and more.

Proceeding from a method of the type generally described above, according to the present invention, the method is particularly characterized in that each received signal block, after its regeneration, is checked in a regenerative repeater, controlled by the bit clock pulse, as to its correct block phase, and therefore the block clock pulse phase necessary for the further accurate processing of the signal block is determined.

The knowledge underlying the present invention is that the shifting signal block phase is advantageously best eliminated in that the received signal blocks, after regeneration with a simultaneous bit synchronization of the receiver clock pulse, are respectively checked as to their correct block clock pulse phase and this block clock pulse phase is newly determined for each signal block with respect to its further processing.

For checking the block phase there are basically two possibilities. If the signal blocks contain a signal-content related error protection in the form of an additional encoded information, such as is the case, for example, with the so-called forward error correction (FEC), then the correct block phase can be determined by the above method which is specifically characterized in that each signal block, after regeneration, is evaluated with respect to its error check and possibly following error correction at least for three successive block phases at an interval of one bit and, in dependence upon the respective error result, the error-check and possibly error-corrected signal block is selected for further processing, which is error-free, or exhibits the smallest error number, respectively, insofar as this error number still lies within the error tolerance range guaranteeing its utilizability.

The other possibility proceeds from the assumption that the signal blocks to be transmitted are transmitted with a specific time signal as an error protection, which signal is then evaluated at the receiver for the determination of the respectively correct block phase by the method which is particularly characterized in that, at the transmitter, there is added to each signal block, for the purpose of error protection, a specific time signal in the form of a code sequence with autocorrelation properties suitable for the receiver determination of the corrected block phase, that, in addition, this specific time signal, after its recovery from the respective signal block, at least for three successive block phases at an interval of one bit, for the determination of the correct block phase, is evaluated by means of an error check, and subsequently the intermediately stored signal block with the correct block phase determined in this manner is again stored for further processing.

Further, the code representing the specific time signal is fixed with respect to its order correlation properties that, in the case of the receiver comparison between the time signal fixedly-stored at the receiver and the received specific time signal, not only a correlation peak occur in the case of a corresponding bit phase, but at least also in the case of a mutual phase shift of $\pm n$ bits (for "n" a positive integer $\leq 2$).

The specific time signal is respectively transmitted in the form of a block unit at a specified location within a signal block according to a further feature.

The method may be further characterized in that the specific time signal is respectively transmitted in subdivided form at various fixedly-specified locations within a signal block.

The method may be further characterized in that the specific time signal is respectively transmitted in the form of a block unit with a block signal and its position, relative to the signal block beginning, in the sequence of the signal blocks is therefore subjected in a pseudo-random manner to a shift.

If the signal blocks to be transmitted are speech signals according to their content, then it is sufficient for the receiver reconstruction of the transmitted speech signal if a signal block, recognized as jammed, is replaced by a non-jammed signal block by the method which is further characterized in that, at the receiver and the course of further signal processing, a signal block recognized as jammed is replaced through repetition of the immediately-preceding undisturbed signal block.

The method, may be advantageously further characterized in that, at the receiver, in the case of occurring interferences which make a determination of the correct block phase of the signal blocks impossible, it is ascertained by way of a delay time integration of the determination results when a connection is to be regarded as interrupted, and accordingly the receiver is to be conditioned into a connection-free operating state in which it executes a search operation.

BRIEF DESCRIPTION OF THE DRAWINGS

Other objects, features and advantages of the invention, its organization, structures for carrying out the method and its mode of operation will be best understood from the following detailed description, taken in conjunction with the accompanying drawings, on which.

DESCRIPTION OF THE PREFERRED EMBODIMENTS

Figure 1:
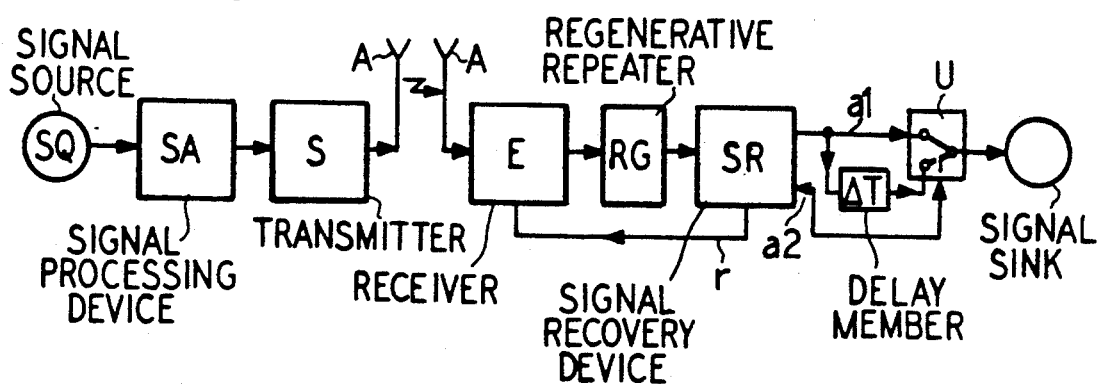
FIG. 1 is a schematic block diagram of a radio system operating in accordance with the present invention.

The block circuit diagram of the radio system according to FIG. 1 comprises, on the transmitting side, a signal source SQ, a signal processing device SA connected thereto for processing the signal to be transmitted, and a transmitter S having an antenna A. The transmitter S executes a burst operation via the antenna A in which the successive signal blocks are respectively radiated with a radio carrier frequency alternating in a pseudo-random manner.

On the receiving side of the radio system according to FIG. 1, the signal received at the receiver antenna A is supplied to a receiver E which converts the incoming signal blocks, taking into account their radio carrier frequency, into a specified intermediate frequency range and transmits the same to a regenerative repeater RG. The regenerative repeater RG exhibits a clock pulse generator synchronized to the bit clock pulse of the incoming signal blocks and the actual regeneration stage. The bit-synchronized signal blocks, are supplied at the output of the regenerative repeater to a signal recovery device SR and are checked as to the correct block phase, respectively, and are subsequently supplied, in the correct block phase, via a transfer switch U, to a signal sink SS.

As illustrated in FIG. 1, the signal blocks at the output a1 of the signal recovery device SR are directly supplied to the one switching contact of the transfer switch U, and its other switching contact is supplied via a delay member. $\Delta T$ having a delay time which is equal to the signal block length. In this manner it becomes possible, in the case of transmitted signals having redundancy, such as is the case for example with speech signals, to replace a signal block recognized by the signal recovery device as jammed with the preceding non-jammed signal block. For this purpose, the signal recovery device SR, via its second output a2, switches the transfer switch U, for the duration of a signal block, from the switching position illustrated in solid lines to the switching position illustrated in broken lines in which the signal block, delayed by a signal block length, then reaches the input of the signal sink SS a second time.

As the receiving side of FIG. 1 further illustrates, the signal recovery device SR exhibits a return line r to the receiver E. By way of the return line r, the signal recovery device SR transmits a signal to the receiver E when, in the case of occurring jammings, which render impossible a determination of the correct block phase, it ascertains, by way of a delay time integration of the determination results, that the connection is interrupted. With this signal, the receiver E is then placed into a connection-free operating state in which it executes a search operation.

As has already been stated, fundamentally there exist two possibilities of receiving-side checking of the block phases of the received signal blocks, depending upon in what form the signals to be transmitted are shaped on the transmitting side in the signal processing device SA.

Figure 2:
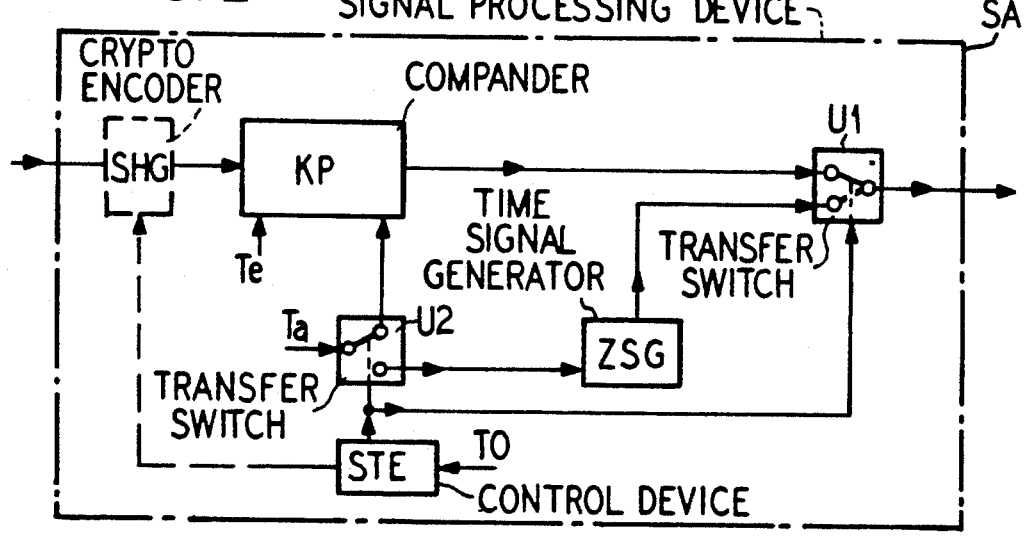
FIG. 2 is a block circuit diagram showing further details of the transmitter-side signal preparation for a first embodiment of the invention utilizing the radio system of FIG. 1.

In the first embodiment of a radio system constructed in accordance with FIG. 1 for carrying out the method of the invention, the digital signals delivered by the signal source SQ, pursuant to dispensing with a signal content-dependent additional error code, are provided with a special time signal which is independent of the signal content. The block circuit diagram pertaining hereto for the transmission signal processing device SA according to FIG. 2 shows that the digital signals delivered by the signal source SQ are supplied to a compander KP which has memory properties and in which the successive signal bits are read in with a read clock pulse Te and are read out with a more rapid read clock pulse Ta. In this manner, signal components of the signal blocks are formed which are necessary for the transmission in accordance with the frequency hopping technique. The special time signal is generated in a time signal generator ZSG. The output of the time signal generator ZSG and the output of the compander KP are supplied to respective contacts of a transfer switch U1 whose transfer contact is connected to the modulation input of the transmitter S, i.e. it transmits the output of the signal processing device SA. The read clock pulse Ta is associated both with the compander KP and with the time signal generator ZSG. For this purpose, a transfer switch U2 is provided and has one switch contact connected to the read clock pulse input of the compander KP and another switching contact connected with the clock pulse input of the time signal generator ZSG. The read clock pulse Ta is provided to the transfer contact of the transfer switch U2. The transfer switch U1 and the transfer switch U2 are commonly activated by a control device STE which, in turn, is supplied with the system base clock pulse T0. In case the signals are to be transmitted encoded, a cryptographic device SHG, illustrated by broken lines, is provided to the input of the compander and is controlled by a cryptogenerator included in the control device STE. The control of the transfer switch U1 and U2 by the control device STE proceeds in such a manner that, upon connection of the read clock pulse Ta to the read clock pulse input of the compander KP, the read signal components are transmitted via the transfer switch U1 to the modulator input of the transmitter S, and, upon connection of the read clock pulse Ta to the clock pulse input of the time signal generator ZSG, the specific time signal is transmitted by way of the transfer switch U1 to the modulator input of the transmitter S.

Figure 3:
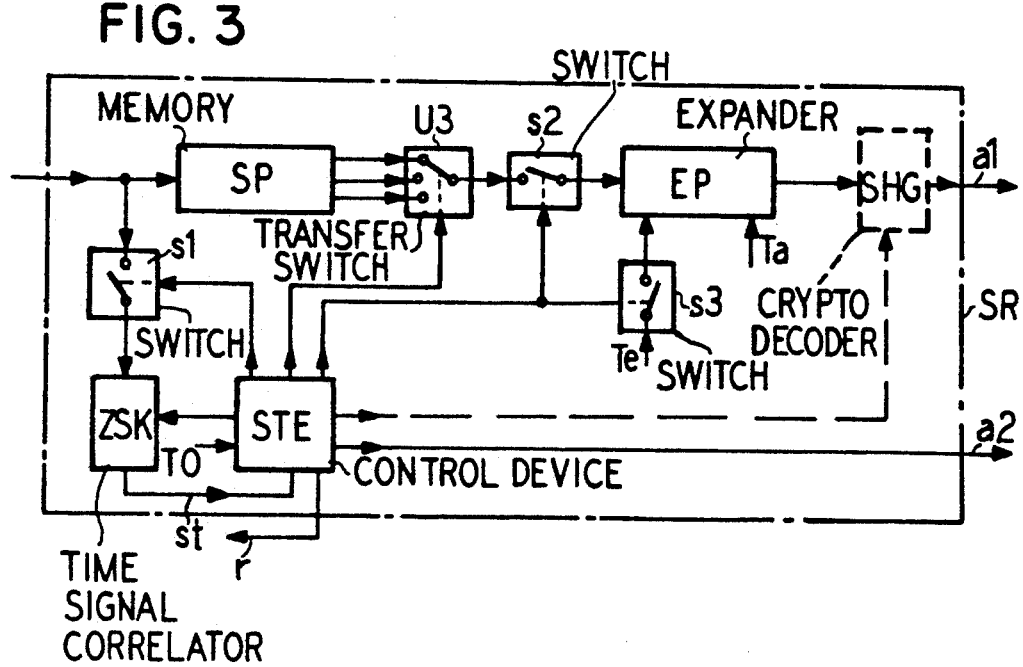
FIG. 3 is a block circuit diagram showing further details of the receiving-side signal recovery for the first embodiment of the invention.

The signal recovery device SR of the receiver is illustrated in FIG. 3 and corresponds to the transmission signal processing device SA of FIG. 2 for a first embodiment of a radio system constructed in accordance with FIG. 1, and comprises, at its input, a memory SP for storing the incoming signal blocks. Simultaneously, at the input, and by way of a switch s1, controlled by a control device STE, the signal component of an incoming signal block is gated out and the remaining specific time signal is supplied to a time signal correlator ZSK. At the output of the memory SP, three outputs are provided which are connected with three switch contacts of a triple transfer switch U3. The stored signal block can be removed by way of each of the three outputs. However, at each of the three outputs, it has a different bit phase. Relative to the center output, the signal block exhibits at the upper output a phase shift of ±1 bit and, at the lower output, phase shift of ±1 bit. Depending upon the time signal correlator result, the time signal correlator ZSK transmits, via a control line st, to the control device STE a signal which is converted in the control device STE for the control of the transfer switch U3 in such a manner that the transfer switch U3 is brought into the switching position in which the signal block recognized with the correct block phase can be removed.

The transfer switching contact of the transfer switch U3 is connected by way of a switch s2 with the input of an expander EP to which the read clock pulse Te is supplied via a switch s3 under the control of the control device STE. The control clock pulse for the switch s3 is provided in the same manner for the switch s2 in the path between the transfer switch U3 and the input of the expander EP. When both switches s2 and s3 are closed, the signal component of the signal block stored in the memory SP, in the correct block phase, is read into the expander EP which also has memory properties. In this manner, the specific time signal, likewise present in the signal block, is gated out of the signal flow. The signal components stored in this manner in the expander EP are now, for the purpose of recovery of the original continuous signal, read from the expander EP with the read clock pulse Ta which, in contrast to the transmitting side, is here correspondingly slower relative to the read-in clock pulse Te, and, insofar as the signal was encoded, the signal components are supplied to an output a1 by way of a crypto decoder SHG, also illustrated with broken lines. This applies, moreover, also to the representations of cryptographic devices according to FIGS. 4 and 5. Corresponding to the receiving side of the radio system according to FIG. 1, the signal recovery device SR additionally comprises an output a2 for the transfer switch U, as well as a return line r to the receiver E. Both control lines are likewise operated by the control device STE.

The second basic possibility for checking the block phase proceeds from the condition that each signal block is provided with a signal content specific error protection in the form of an additional error code. The transmission signal processing corresponding to this second embodiment is illustrated by the block circuit diagram of FIG. 4. It comprises, at its input, two elements which are controlled with a read-in clock pulse Te and a read-out clock pulse Ta; more specifically, it comprises a memory SP and an error protection device FSE which are connected in parallel at the input and have their outputs connected to respective contacts of a transfer switch U4 which is simultaneously controlled by the error protection device FSE. The error protection device FSE determines the respective error code for the signal component to be transmitted in a signal block and adds the error code to the respective signal component through switching of the transfer switch U4 from the switching position illustrated in solid lines to the opposite switching position. The signal blocks formed in this manner are supplied by the transfer switch contact of the transfer switch U4, possibly via a cryptographic encoding device SHG, to the modulation input of the transmitter S according to FIG. 1. The cryptographic encoding device SHG receives its code from a cryptogenerator PNG which is likewise controlled by the read-out clock pulse Ta. A specific representation of the clock pulse supply has been omitted in that the same is well known to those skilled in the art.

Figure 5:
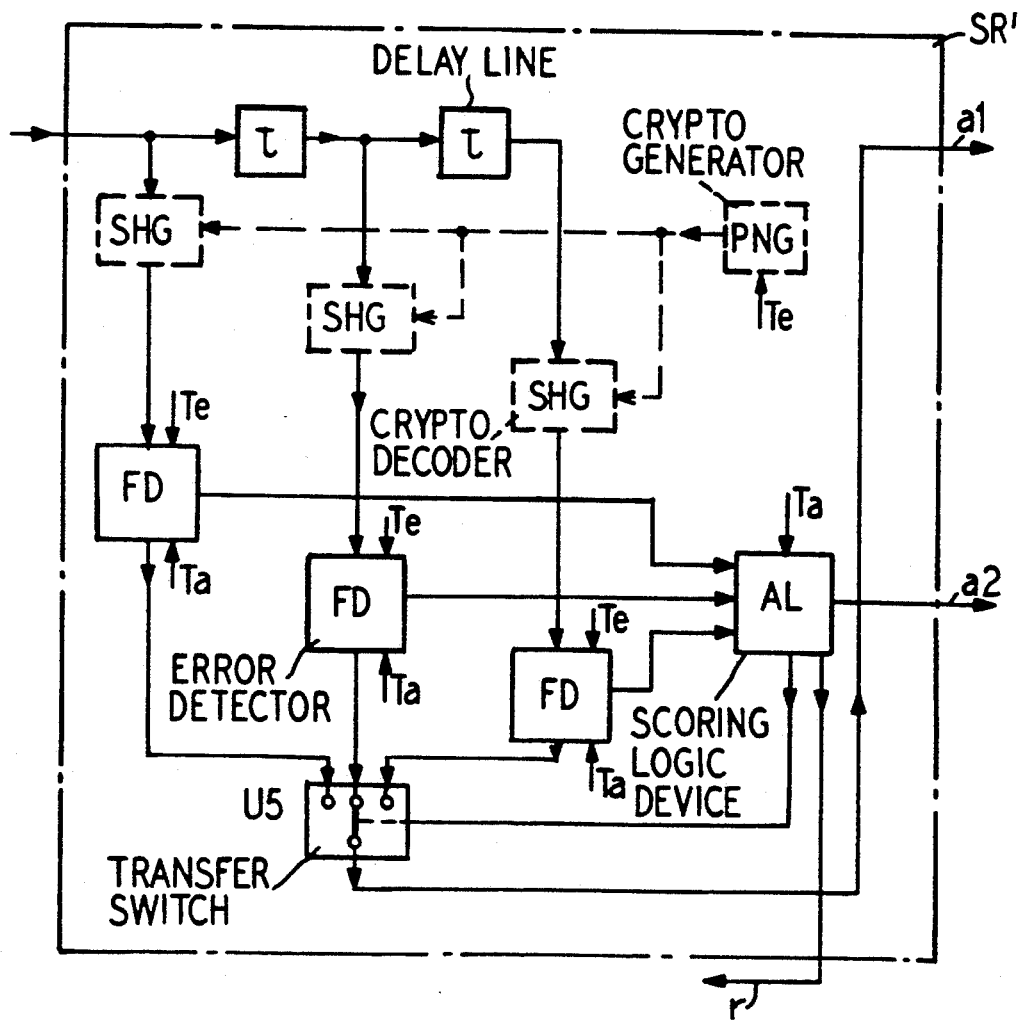
FIG. 5 is a block circuit diagram showing further details of the receiving-side signal recovery for the second embodiment of the invention.

The receiving side signal recovery device SR', corresponding to the signal processing device SA' is illustrated in FIG. 5 and provides, at its input, a delay line network comprising two delay lines $\tau$, which delay an incoming signal block by one bit, respectively. The delay line network, comprising the two delay lines $\tau$, has three taps at which the same signal block is supplied to an error detector FD in three phases, shifted by one bit, respectively, possibly via a cryptographic decoding device SHG which controls decoding. The three error detectors FD are connected at their outputs by way of a triple transfer switch U5 with the output a1. The error detectors FD separate, with each signal block, the signal component from the error code and check by way of the error code the correct reception of the signal block. If the block phase is not correct, the error detector indicates an error which is supplied by each error detector to a scoring logic device AL common thereto. In this manner, the scoring logic device AL can determine the correct block phase and can control correspondingly the transfer switch U5 into the switching position in which, at the output of the respective error detector FD, the signal component of the original signal block is available in the correct block phase. The scoring logic AL operates, corresponding to the control device STE according to FIG. 3, the control line, connected with the output a2, for the transfer switch U as well as the control return line r for the receiver E according to FIG. 1. The possibly present cryptographic devices SHG are all supplied with the same code signal which is, in turn, generated by the cryptogenerator PNG, likewise illustrated by broken lines and controlled by the read clock pulse Te.

Figure 6:
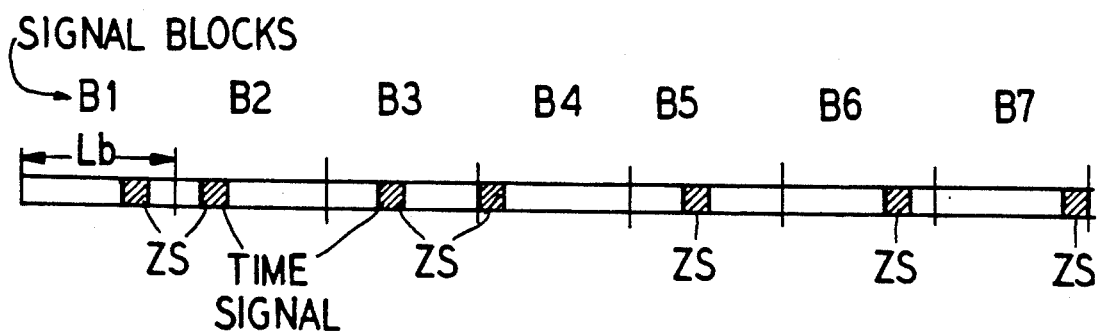
FIG. 6 is a time diagram, explaining in greater detail the first embodiment of the invention in conjunction with FIGS. 2 and 3, with a first type of signal blocks.

The time diagram for a signal block sequence according to FIG. 6 shows seven successive signal blocks B1, B2 . . . B7 each having a block length Lb and which are respectively provided with a specific time signal ZS in the form of a partial block which is here illustrated as a hatched element. In order not to allow the specific time signal, which is not encoded in the signal block, to be readily recognized, is positioned within a signal block relative to the beginning of a signal block is subjected in a pseudo-random manner to a shift in the sequence of the signal blocks B1, B2 . . . B7. This pseudo-random shift can be readily controlled with the aid of the basic circuit illustrated in FIG. 2 since, of course, always when the transfer switches U1 and U2 are activated by the control device STE, relative to the output of the signal processing device SA, the signal is disconnected and the time signal is switched on and vice-versa. By way of synchronization between the transmitting side and the receiving side, it is guaranteed that, also at the receiving side, the control device STE of the signal recovery device SR according to FIG. 3 can synchronously control the switch s1 in such a manner that, given a constantly alternating position of the specific time signal ZS within a signal block, always only the time signal within a specified possible shift width can reach the input of the time signal correlator ZSK. Advantageously, this time signal, representing a specific time character, is a code which is so fixed with respect to its auto correlation properties that, upon comparison in the time signal correlator between the time signal fixedly stored therein at the receiving side and the received specific time signal, not only in the case of a corresponding bit phase, but at least also in the case of a mutual phase shift of $+n$ bits (where n is a positive integer $\leq 2$) a correlation peak occurs. The distance from the correct correlation peak to further correlation peaks in the case of the phase shift of $\pm n$ bits is to be determined such that, on the receiving side, the correct block phase can be satisfactorily recognized at any time, and the additional correlation peaks merely serve the purpose of confusing an unauthorized monitor. The code exhibiting such auto correlation properties is illustrated, for example, by the bit pattern for $n=3$ listed in the following 0 11 00 10 11 01.

Figure 7:
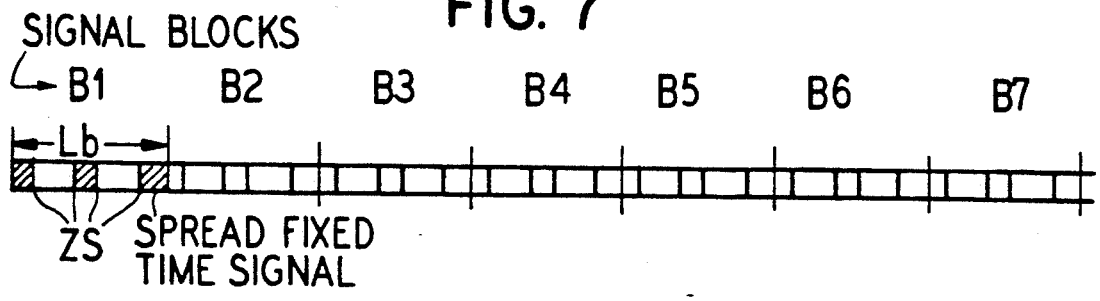
FIG. 7 is a time diagram of a second type of signal blocks, explaining in greater detail the first embodiment of the invention in conjunction with FIGS. 2 and 3.

The additional time diagram according to FIG. 7 corresponds to that according to FIG. 6, with the exception that in FIG. 7 the specific time signal is arranged "blurred" at several locations within each of the successive signal blocks B1, B2.. B7. The arrangement is fixed for all blocks. Such a blurred specific time signal, indeed, delivers an improved "beyond everything-effectiveness criterion" of a signal block"; however, it renders the auto correlation difficult since the comparison here must be conducted relative to noise. The transmission of the specific time signal ZS according to FIG. 6, indeed, permits a reliable auto correlation because here the comparison of the time signal is conducted relative to a shifted time signal. The error-free reception, however, does not provide any guarantee that the signal component of the signal block is likewise undisturbed. Because of the more favorable realization, however, generally the advantage is to be given the transmission of the specific time signal ZS corresponding to FIG. 6.

Figure 4:
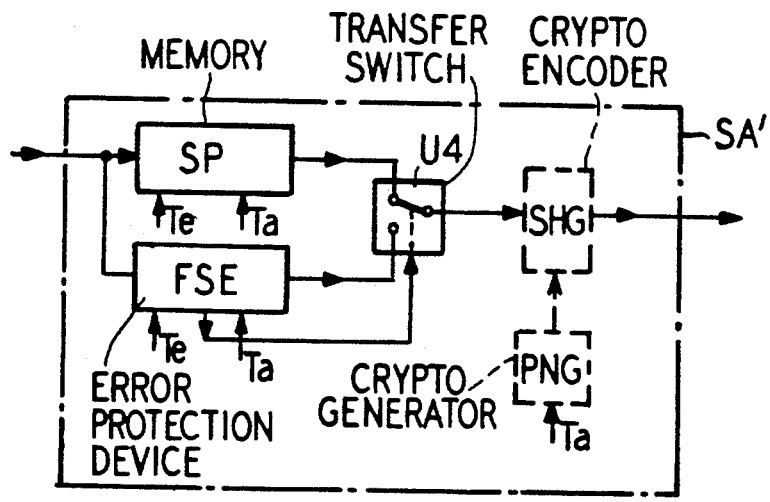
FIG. 4 is a block circuit diagram showing further details of the transmitting-side signal preparation for a second embodiment of the invention utilizing the radio system of FIG. 1.
Figure 8:
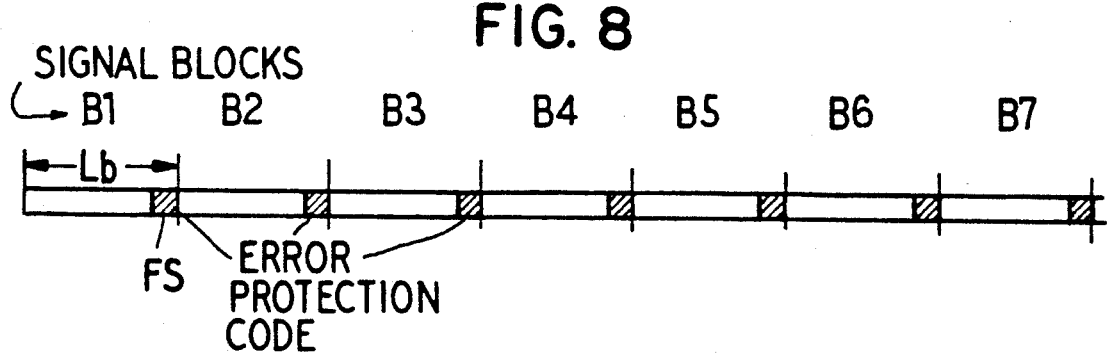
FIG. 8 is a time diagram of signal blocks explaining in greater detail the second embodiment of the invention with respect to FIG. 1 in conjunction with FIGS. 4 and 5.

The time diagram according to FIG. 8 dispenses with a specific time signal which is independent of the signal, i.e. it corresponds to the second embodiment of a radio system according to FIG. 1, corresponding to FIGS. 4 and 5 for the transmitting side signal processing device SA' and the receiving side signal recovery device SR'. The error protection code FS is, respectively, appended to the end of the signal portion and forms, together with the latter, respectively, a signal block having a block length Lb. In FIG. 8, the error protection code FS is respectively indicated by hatching. Its recognition in the signal can be obviated in a simple fashion in that, in the case of utilization of encoding, the entire signal block is encoded on the transmitting side and decoded on the receiving side.

The present invention finds use in radio systems which operate with frequency hopping and which has special significance in the case of military detail radio in tactical use because, even under difficult operating conditions, radio traffic can still be carried out.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In a method for protected transmission of digital signals by way of radio connection in which the signals are transmitted in blocks and in correspondence with the frequency hopping principle in which block-by-block transmission occurs on the basis of pseudo-randomly changing radio carrier frequencies, and in which the successive signal blocks are provided with error protection, and in which synchronization between a transmitting station and a receiving station is provided by quartz clocks at the stations, the improvement therein comprising the steps of:
   regenerating each received signal block;
   checking each regenerated signal block as to its correct phase with respect to a reference phase to determine the block clock pulse phase and correcting the phase of a block in response to a determined phase difference for accurate processing of the signal block;
   performing an error check of each signal block and correcting any perceived error for at least three successive phases at an interval of one bit; and
   selecting for further processing that signal block which exhibits the smallest error number which still lies within a predetermined error tolerance range.

2. The improved method of claim 1, and further comprising the step of:
   for the purpose of error protection, adding to each signal block to be transmitted a specific time signal in the form of a code sequence having good autocorrelation properties suitable for the receiving-side determination of the correct block phase;
   performing an error check of the specific time signal for at least three successive block phases at an interval of one bit for the determination of the correct block phase and storing the signal block having the correct block phase.

3. The improved method of claim 2, and further comprising the steps of:
   at the receiving side, fixedly storing a code representing a specific time signal; and
   comparing the received specific time signal with the stored specific time signal to provide a correlation peak of the signals at a corresponding bit phase and also in the case of a mutual phase shift of $\pm n$ bits, where n is a positive integer $\leq 2$.

4. The improved method of claim 3, wherein:
   the step of adding a specific time signal is further defined as adding the specific time signal at a specified location within a signal block.

5. The improved method of claim 3, wherein the step of adding the specific time signal is further defined as:
   adding the specific time signal in subdivided form at various fixedly-specified locations within a signal block.

6. The improved method of claim 3, wherein the step of adding the specific time signal is further defined as:
   adding the specific time signal, relative to the beginning of each signal block, in a pseudo-random position within the respective signal blocks.

7. The improved method of claim 1 in which the digital signals to be transmitted are speech signals, and further comprising the step of:
   replacing a jammed signal block with the immediately-preceding unjammed signal block.

8. The improved method of claim 1, wherein, at the receiving side, in the case of interference which makes a determination of the correct block phase impossible, the improvement further comprises:
   performing a transit time integration of the determination results to determine when a connection is to be regarded as interrupted; and
   disconnecting the receiving station from the transmitting station so that it may execute a search operation.

* * * * *